(12) United States Patent
Kashiwagi et al.

(10) Patent No.: US 6,941,611 B2
(45) Date of Patent: Sep. 13, 2005

(54) ENERGY ABSORBING WIPER SYSTEM FOR VEHICLE

(75) Inventors: Masakazu Kashiwagi, Wako (JP); Tomoaki Sakai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/309,443

(22) Filed: Dec. 3, 2002

(65) Prior Publication Data
US 2003/0106179 A1 Jun. 12, 2003

(30) Foreign Application Priority Data
Dec. 12, 2001 (JP) .......................................... 2001-379064

(51) Int. Cl.⁷ .............................. B60S 1/16; B60S 1/06
(52) U.S. Cl. ................ 15/250.31; 15/250.3; 15/250.34; 403/2; 403/DIG. 3
(58) Field of Search ......................... 15/250.3, 250.31, 15/250.34, 250.27; 296/96.17, 96.15; 403/2, DIG. 3

(56) References Cited

U.S. PATENT DOCUMENTS

| | | | | |
|---|---|---|---|---|
| 3,790,985 A | * | 2/1974 | Kessler ..................... | 15/250.34 |
| 6,317,918 B1 | * | 11/2001 | Kagawa et al. .......... | 15/250.31 |
| 6,505,376 B1 | * | 1/2003 | Kagawa ..................... | 15/250.31 |
| 6,513,186 B1 | * | 2/2003 | Zimmer .................... | 15/250.31 |
| 6,568,023 B2 | * | 5/2003 | Perin et al. ................ | 15/250.3 |
| 6,594,853 B1 | * | 7/2003 | Igarashi ................... | 15/250.31 |

FOREIGN PATENT DOCUMENTS

| | | | |
|---|---|---|---|
| DE | 2133077 | * | 1/1973 |
| DE | 198 20 556 | | 11/1999 |
| FR | 1579347 | * | 7/1969 |
| JP | 11-301420 | | 11/1999 |
| WO | WO 99/38736 | | 8/1999 |
| WO | WO99/38736 | * | 8/1999 |

* cited by examiner

Primary Examiner—Gary K. Graham
(74) Attorney, Agent, or Firm—Merchant & Gould P.C.

(57) ABSTRACT

An energy absorbing wiper system for a vehicle, including: a pivot shaft to which a wiper arm is fixed; a pivot shaft holder into which the pivot shaft is rotatably inserted; an impact absorbing portion provided between the pivot shaft and the pivot shaft holder, the impact absorbing portion being adapted to be broken or deformed when a certain load is applied thereto to thereby permit the movement of the pivot shaft in a sinking direction relative to the pivot shaft holder; and, an energy absorbing member interposed between the wiper arm and the pivot shaft holder, the energy absorbing member adapted to be broken or deformed while permitting the sink of the pivot shaft when the pivot shaft moves in the sinking direction after the impact absorbing portion has been broken or deformed, to thereby absorb the moving energy of the pivot shaft.

3 Claims, 8 Drawing Sheets

ENERGY ABSORBING WIPER SYSTEM FOR VEHICLE

BACKGROUND OF THE INVENTION

1. Field of the Invention

The present invention relates to an energy absorbing wiper system for a vehicle.

2. Description of the Related Art

Among wiper systems for a vehicle, there is known a wiper system having an energy absorbing system for absorbing an external force when it is applied thereto to thereby minimize damage to the wiper system itself or a vehicle body panel. Referring to FIGS. 15, 16, the wiper system having the energy absorbing structure will be described. In the figures, a cylindrical pivot shaft holder 2 is fixed to a vehicle body panel 1. A pivot shaft 3 is rotatably inserted into the pivot shaft holder 2, and a lower end of the pivot shaft 3 is connected to another pivot shaft (not shown) by a link member 4. On the other hand, a proximal end 6 of a wiper arm 5 having a wiper blade (not shown) attached to a distal end thereof is fixed to an upper end of the pivot shaft 3.

A washer 8, which is restricted with respect to an upper movement by a snap ring 7, is mounted on the pivot shaft 3 at a substantially central portion thereof in a vertical direction. This washer 8 is retained to a retaining plate 9 mounted to a circumferential portion of an upper end of the pivot shaft holder 2. In addition, a cylindrical support member 10 is interposed vertically between the pivot shaft holder 2 and the pivot shaft 3. This construction is disclosed in JP-A-II-301420.

Consequently, when an external force is applied to the pivot shaft 3 from above and the external force exceeds the rupture stress of the retaining plate 9, the pivot shaft 3 which is in a condition shown in FIG. 15 is forced to sink into the pivot shaft holder 2 as shown in FIG. 16 by the shear fracture of the retaining plate 9.

In the related art, while the breaking load of the retaining plate 9 can be set as desired by modifying the strength and rigidity thereof, the problem with the prior art system is that space is wasted because space must be provided to secure a sinking stroke of the pivot shaft 3 into the pivot shaft holder 2 so as to avoid the bottoming out of the pivot shaft holder 2 when the retaining plate 9 is broken.

SUMMARY OF THE INVENTION

An object of the invention is to provide an energy absorbing wiper system for vehicles which can increase further the energy absorbing properties without wasting space provided for the sinking stroke of the pivot shaft.

With a view to solving the problem, according to a first aspect of the invention, there is provided an energy absorbing wiper system for a vehicle including a pivot shaft (for example, a pivot shaft 23 in an embodiment) to which a wiper arm (for example, a wiper arm 14 in the embodiment) is fixed, rotatably inserted into a pivot shaft holder (for example, a pivot shaft holder 17 in the embodiment) and an impact absorbing portion (for example, a retaining plate 30 in the embodiment) provided between the pivot shaft and the pivot shaft holder which is adapted to be broken or deformed when a certain load is applied thereto to thereby permit the movement of the pivot shaft in a sinking direction relative to the pivot shaft holder, and an energy absorbing member (for example, 20, 20A, 20B, 20C in the embodiment) which is provided in such a manner as to be interposed between the wiper arm and the pivot shaft holder so as to be broken or deformed to thereby absorb the moving energy of the pivot shaft while permitting the sink of the pivot shaft when the pivot shaft moves in the sinking direction after the impact absorbing portion has been broken or deformed.

According to the construction, the energy absorbing member can be disposed by making use of a space between the wiper arm and the pivot shaft holder. When a certain load is applied to the pivot shaft via the wiper arm, the impact absorbing portion is caused to be broken or deformed, thereby allowing the pivot shaft to start to sink into the pivot shaft holder. As, the wiper arm moves towards the pivot shaft holder, and the energy absorbing member is broken or deformed to thereby absorb the moving energy of the pivot shaft. Accordingly, a wiper system can be obtained which is small in size yet provides a high energy absorbing capability.

According to a second aspect of the invention, the energy absorbing member is formed into a cylindrical structure provided with a circumferential surface which can be bent and deformed.

According to the construction, the impact absorbing portion is broken or deformed and the cylindrical energy absorbing member can absorb the energy of the moving pivot shaft while being compressed and deformed. In addition, when the circumferential surface of the cylindrical energy absorbing member is bent and deformed, the bent portions can absorb the energy of the moving pivot while moving the circumferential surface of the energy absorbing member.

According to a third aspect of the invention, an upper circumferential edge of the energy absorbing member supports the pivot shaft.

According to the construction, the energy absorbing member can also be provided with a function of supporting the pivot shaft.

DETAILED DESCRIPTION OF THE PREFERRED EMBODIMENTS

Figure 6:
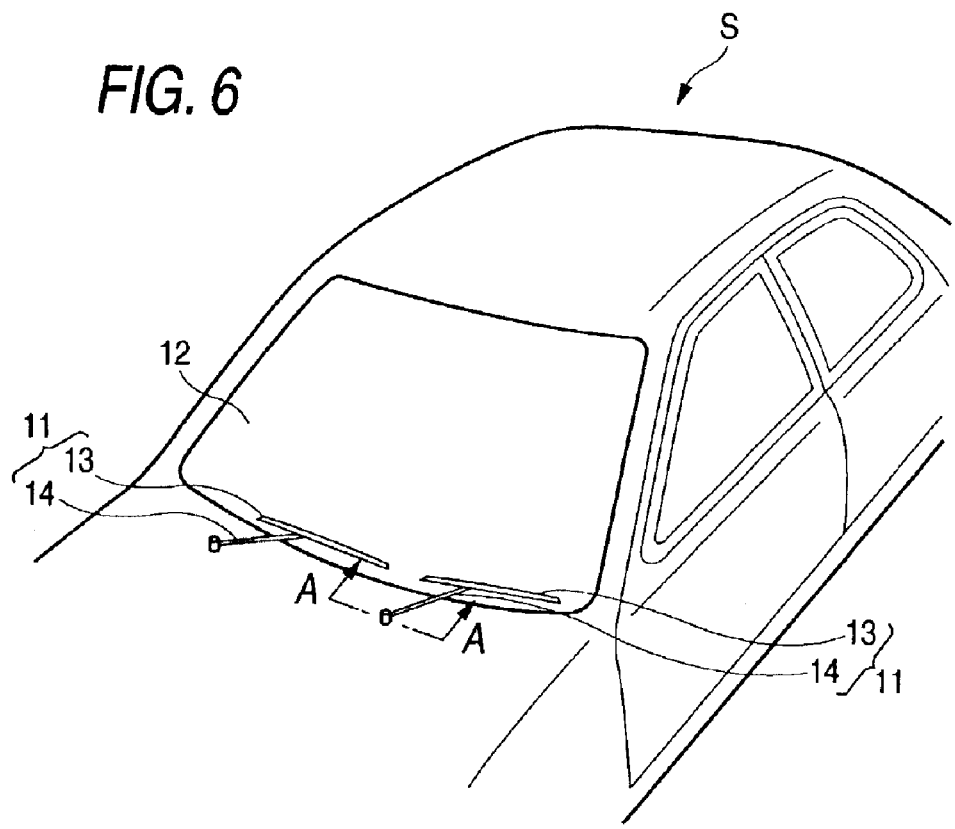
FIG. 6 is a perspective view showing a front part of a vehicle.

Embodiments of the invention will be described below with reference to the accompanying drawings. FIG. 6 is a perspective view of a front part of a vehicle. As shown in the figure, a pair of left and right wiper systems are provided on a windshield 12 in front of a driver seat and a front passenger seat. The wiper systems 11 perform wiping operations via wiper arms 14 adapted to swing back and forth wiper blades 13 which slidably contact the surface of the windshield 12.

Figure 1:
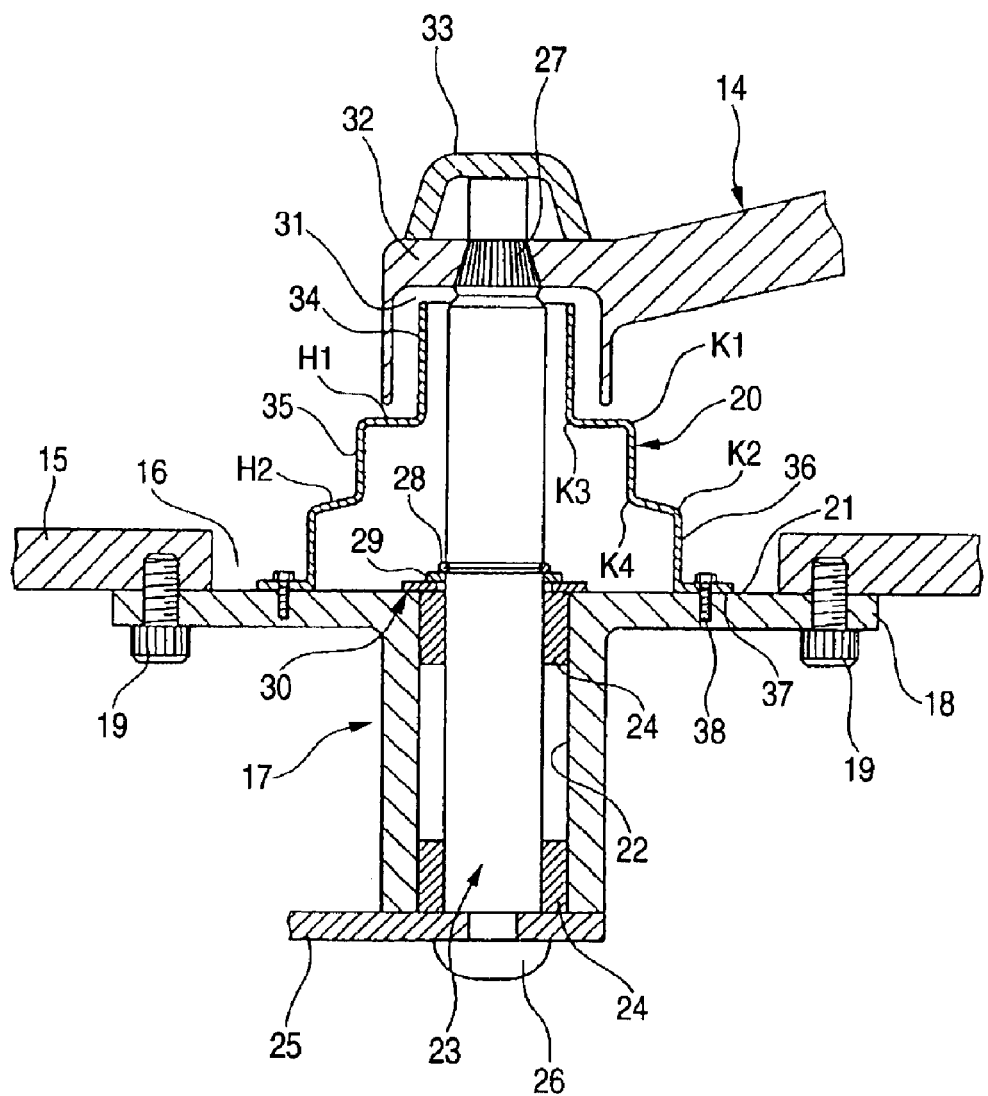
FIG. 1 is a sectional view taken along the line A—A in FIG. 6, which shows a mounting condition according to an embodiment of the invention.

FIG. 1 is a sectional view taken along the line A—A in FIG. 6.

In the figure, a flange portion 18 of a pivot shaft holder 17 is fixed to a mounting opening 16 in a vehicle body panel 15 from a back side thereof with bolts 19. An upper face of the pivot shaft holder 17 is formed flat so as to constitute a mounting surface 21 for an energy absorbing member 20, which will be described later.

An inserting hole 22 is formed in the pivot shaft holder 17 in such a manner as to pass therethrough in a vertical direction from the mounting surface 21, and a pivot shaft 23 is inserted into this inserting hole 22. Two cylindrical support members 24 are interposed vertically between the inserting hole 22 and the pivot shaft 23 so that the support members 24 can support the pivot shaft 23 rotatably relative to the pivot shaft holder 17. One end of a link member 25 is fixed to a lower end of the pivot shaft 23 with a bolt 26, and the other end of the link member 25 is linked to a lower end of a pivot shaft (not shown) of the other wiper system 11. The pivot shaft 23 is prevented from coming off from the pivot shaft holder 17 in a vertical direction by the link member 25. In addition, a proximal end upper wall 32 of the wiper arm 14 to which the blade 13 is mounted is fixed to an upper end of the pivot shaft 23 via a splined portion 27 which expands diametrically as it extends downwardly and penetrates through the upper wall 32 in such a manner as to prohibit the rotation of the wiper arm 14 relative to the pivot shaft 23.

A washer 29, which is restricted in upward movement by a snap ring 28, is mounted on the pivot shaft 23 substantially at a vertically central portion thereof, and for example, a metallic or resin retaining plate (an impact absorbing portion) 30 is mounted on an upper circumferential edge of the inserting hole 22 in the pivot shaft holder 17, whereby the pivot shaft 23 is supported in such a manner that the movement of the pivot shaft 23 in a sinking direction relative to the pivot shaft holder 17 is restricted in such a state that the washer 29 is retained in an inner peripheral edge of the retaining plate 30.

Consequently, when a load equal to or larger than a certain magnitude is applied to the pivot shaft 23 which is supported rotatably in the pivot shaft holder 17 in the sinking direction, the retaining plate 30 is broken to thereby absorb the impact.

Here, a bag-like accommodating portion 31 is formed in the distal end of the wiper arm 14 which opens downwardly for accommodating therein an upper portion of the energy absorbing member 20, which will be described later. In addition, an upper end portion of the pivot shaft 23 which protrudes from the distal end upper wall 32 of the wiper arm 14 is covered by a cap 33 which is mounted on the distal end upper wall 32 of the wiper arm 14.

Then, the energy absorbing member 20 is provided between the mounting surface 21 of the pivot shaft holder 17 and the accommodating portion 31 in the distal end of the wiper arm 14. This energy absorbing member 20 is designed to be deformed when the pivot shaft 23 receives the load applied thereto in the sinking direction and moves in the inserting hole 22 in the pivot shaft holder 17 in the sinking direction after the retaining plate 30 is broken, whereby the moving energy of the pivot shaft 23 is absorbed.

The energy absorbing member 20 is, for example, a metallic member (or it may be a resin member) and has a small-diameter portion 34, a mid-diameter portion 35 and a large-diameter portion 36 from above in that order, and a circumferential surface thereof is formed in a step-like fashion in cross section. Consequently, a first bent portion K1 and a second bent portion K2 are formed sequentially on the outside of the energy absorbing member 20 from the small-diameter portion 34 to the large-diameter portion 36, and similarly a third bent portion K3 and a fourth bent portion K4 are formed sequentially on the inside of the energy absorbing member 20, whereby the energy absorbing member 20 is allowed to be bent and deformed from the respective bent portions K1 to K4 which act as bending or deformation initiating points. In addition, a flat surface H1 is provided between the small-diameter portion 34 and the mid-diameter portion 35 in such a manner as to connect them, and a flat surface H2 is provided between the mid-diameter portion 35 and the large-diameter portion 36 in such a manner as to connect them.

A lower circumferential edge flange portion 37 of the energy absorbing member 20 constructed as described above is fixed to the pivot shaft holder 17 with machine screws 38.

According to the embodiment described above, when an obstacle impacts against the cap 33 and an impact load exceeding the breaking load of the retaining plate 30 is applied to the pivot shaft 23 downwardly via the proximal portion of the wiper arm 14, the retaining plate 30 impacts against the washer 29 to be broken, whereby part of impact energy is absorbed. Then, when the pivot shaft 23 starts to sink into the pivot shaft holder 17 due to energy that could not be absorbed by the broken retaining plate 30, the energy absorbing member 20 held within the accommodating portion 31 in the proximal portion of the wiper arm 14 is pressed against the proximal end upper wall 32, whereby the energy absorbing member 20 starts to be compressed and deformed between the proximal end upper wall 32 and the mounting surface 21. When the energy absorbing member 20 starts to be compressed and deformed the small-diameter portion 34 is displaced downwardly, as shown in FIG. 3, whereby the energy absorbing member 20 starts to be bent and deformed largely, as shown in FIG. 3, from the first bent portion K1 and the third bent portion K3 which are shown in FIG. 1, and the flat surface H1 connecting the small-diameter portion 34 and the mid-diameter portion 35 is drawn downwardly to thereby absorb the energy.

Figure 3:
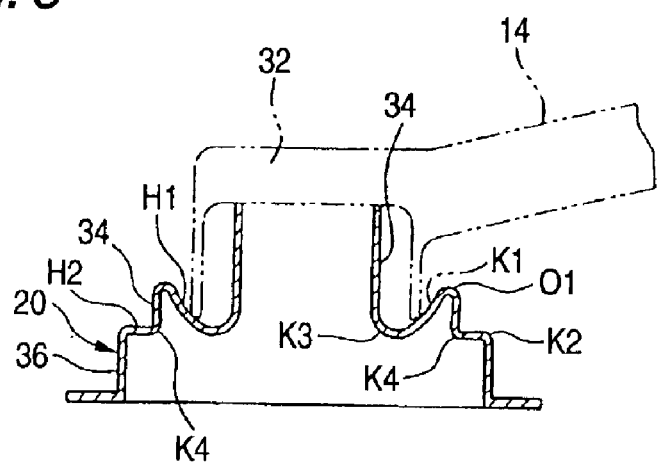
FIG. 3 is a sectional view showing a condition in which an energy absorbing member is deformed.

When the horizontal surface connecting the small-diameter portion 34 and the mid-diameter portion 35 is drawn in downwardly, a location where the first bent portion K1 is formed moves inwardly (refer to a location where K1 is indicated by a chain line in FIG. 3) and is then bent back from the bent condition, this forming newly a first kinked point 01 outwardly of where the first bent portion K1 was formed. Consequently, there occurs a motion in which as if the first bent portion were moving outwardly. Thus, since the first bent portion K1 is bent back and the first kinked point 01 is formed newly, another energy absorption occurs here, too.

Figure 4:
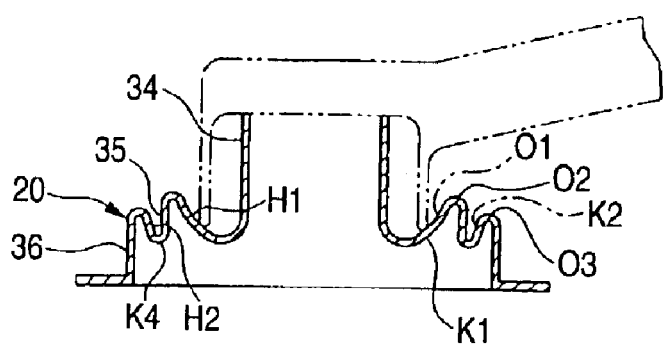
FIG. 4 is a sectional view showing another condition in which the energy absorbing member is deformed.

Then, as shown in FIG. 4, when the small-diameter portion 34 is displaced further downwardly the location where the first kinked portion 01 is formed then moves inwardly (refer to a location where 01 is indicated by a chain line in FIG. 4) and is bent back from the bent condition, whereby a second kinked point 02 is formed newly outwardly of where the first kinked point 01 was formed. Consequently, there occurs a motion in which as if the first kinked point 01 were moving outwardly. Thus, since the first kinked point 01 is bent back and the second kinked point 02 is newly formed, more energy of a large magnitude can be absorbed.

In addition, as this occurs, since the mid-diameter portion 35 is also displaced downwardly as if it were drawn by the downward displacement of the small-diameter portion 34, the energy absorbing member 20 starts to be bent and deformed largely from the second bent portion K2 and the fourth bent portion K4 which act as bending or deformation initiating points, whereby the energy is absorbed when the flat surface H2 connecting the mid-diameter portion 35 and the large-diameter portion 36 is drawn in downwardly.

When the horizontal surface connecting the mid-diameter portion 35 and the large-diameter portion 36 is drawn in downwardly a location where the second bent portion K2 is formed moves inwardly (refer to a location where K2 is indicated by a chain line in FIG. 4) and is bent back from the bent condition, whereby a third kinked point 03 is newly formed outwardly of where the second bent portion K2 was formed.

Consequently, there occurs a motion in which as if the second bent portion K2 were moving outwardly. Thus, since the second bent portion K2 is bent back and the third kinked point 03 is formed, the energy is also absorbed here.

Figure 2:
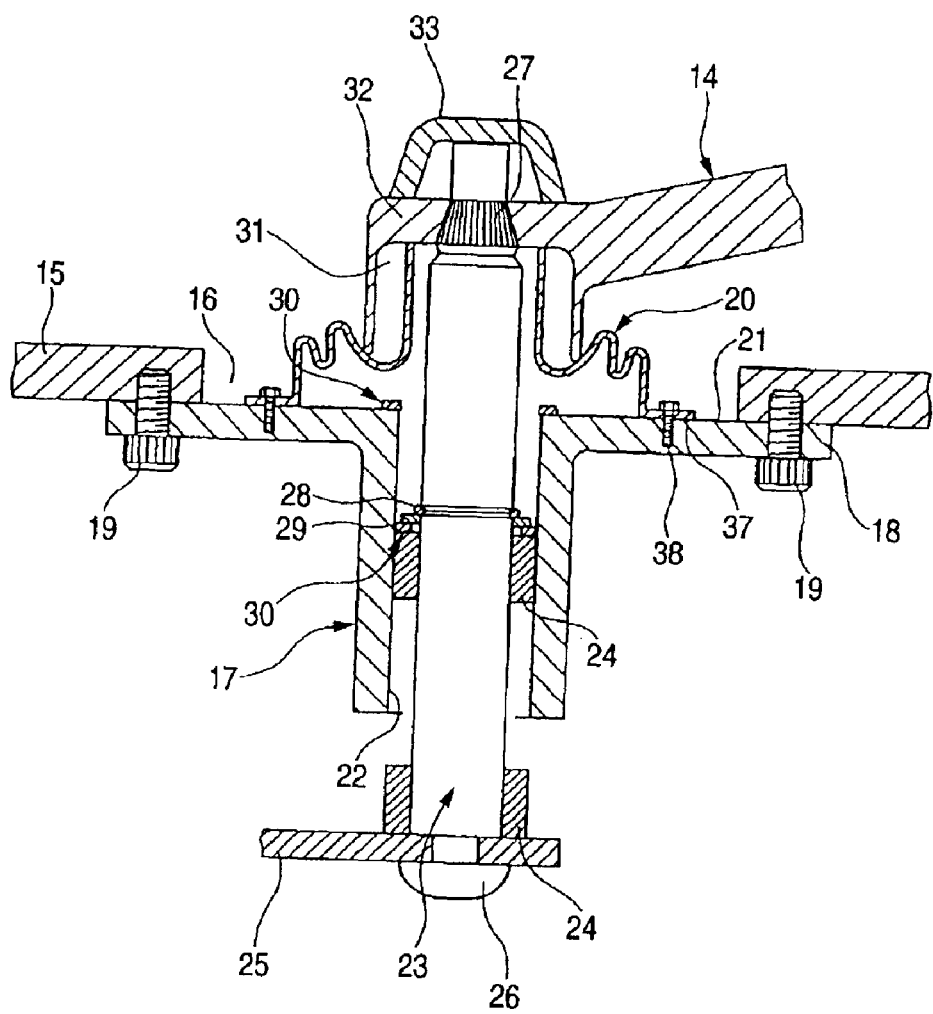
FIG. 2 is a sectional view corresponding to FIG. 1, which shows an energy absorbing condition.

Thus, when the retaining plate 30 is broken and the impact force reaches its peak, the pivot shaft 23 starts to move and sink into the pivot shaft holder 17, and the energy absorbing member 20 absorbs impact energy while being bent and deformed at the respective bent portions K1 to K4, and the bent portions, above all, the first and second bent portions K1, K2 on the circumferential wall of the energy absorbing member 20 repeat bending and stretching while they move along the circumferential surface of the energy absorbing member 20 and are finally bent and deformed as shown in FIG. 2 to thereby absorb the energy.

Figure 5:
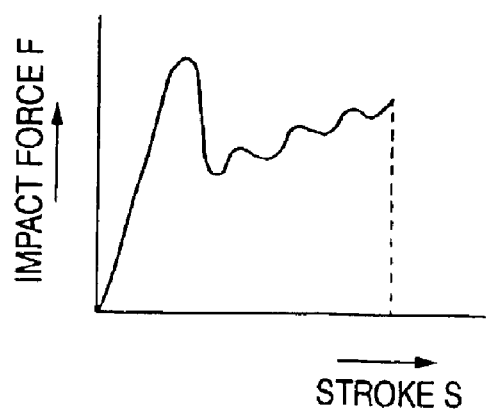
FIG. 5 is a graph showing the energy absorbing properties of the energy absorbing member.

Consequently, as shown in FIG. 5, the impact force which is about to arrive at its peak due to the breakage of the retaining plate 30 maintains a low value while the pivot shaft 23 moves downwardly and most of the energy is absorbed by the energy absorbing member 20 through its long stroke.

According to the embodiment, since the energy absorbing member 20 can absorb the moving energy of the pivot shaft 23 when the pivot shaft 23 is pushed downwardly with the load equal to or larger than the certain value which is applied thereto by an obstacle and starts to move and sink into the pivot shaft holder 17 after the retaining plate 30 has been broken, the energy can be absorbed not only by the broken retaining plate 30 but also by a sinking pivot shaft 23, whereby the energy absorbing capability can be increased by making effective use of the moving stroke in the sinking direction of the pivot shaft 23.

In particular, since the energy absorbing member 20 can absorb energy by being deformed while permitting the sink of the pivot shaft 23, the energy absorbing member 20 is advantageous in that much impact energy can be absorbed while the pivot shaft 23 is moving.

Furthermore, the energy absorbing structure of the embodiment is preferable since even in the event that a load applied to the pivot shaft 23 is inclined, the energy absorbing properties are affected little.

In addition, since not only the respective bent portions K1 to K4 of the energy absorbing member 20 are bent and deformed solely but also in particular, the first and second bent portions K1, K2 repeat bending and stretching while moving diametrically over the circumferential surface of the energy absorbing member 20 as the deformation develops, a lot of energy can be absorbed.

Consequently, the retaining plate 30 can be more fragile by an extent equal to the impact load that is absorbed when the bent portions K1 to K4 are bent and deformed and repeat bending and stretching. As a result, the peak of an impact force generated when the retaining plate 30 is broken can be restricted to as low a level as possible and a damage that would be made to an obstacle can be made as small as possible, thereby making it possible to increase the safety in collision remarkably.

The invention is not limited to the embodiment described above and for example, an energy absorbing member of a different configuration can be utilized. Note that FIGS. 1 and 2 which are used when describing the above embodiment are also used to support the description of the differently configured energy absorbing member.

Figure 7:
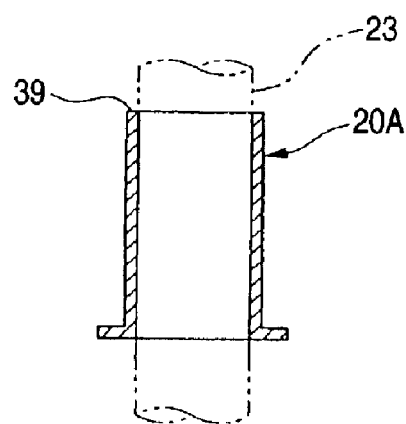
FIG. 7 is a sectional view showing another energy absorbing member.

For example, a cylindrical energy absorbing member 20A as shown in FIG. 7 can be used. This energy absorbing member 20A is mounted on a pivot shaft 23 at a position close to an outer circumference thereof and supports the pivot shaft 23 at an upper circumferential edge 39 thereof. Thus, the energy absorbing member 20A is also provided with a function to support the pivot shaft 23. Since the load borne by the pivot shaft holder 17 can be reduced by an extent that the energy absorbing member 20A is provided with the supporting function of pivot shaft 23, the pivot shaft holder 17 can be thinner in thickness and smaller in size to that extent, and a sufficient space for permitting the deformation of the energy absorbing member 20A can be secured around the circumference of the pivot shaft 23.

Figure 8:
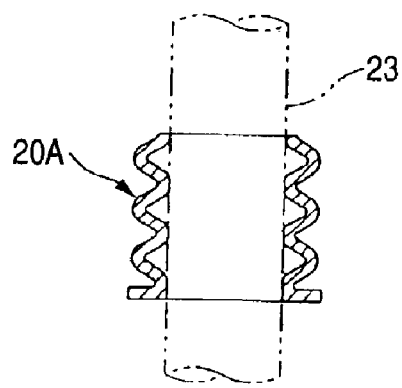
FIG. 8 is a sectional view showing a condition in which the energy absorbing member shown in FIG. 7 is deformed.
Figure 9:
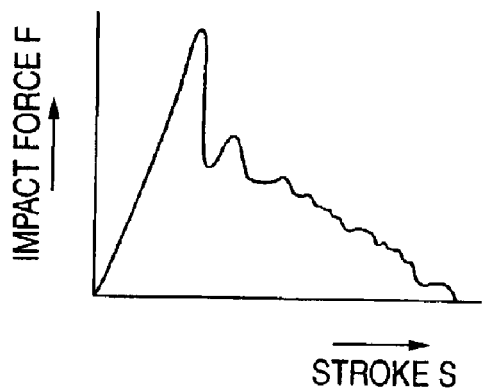
FIG. 9 is a graph showing the energy absorbing properties of the energy absorbing member shown in FIG. 7.

When the energy absorbing member 20A is compressed, since the inward deformation thereof is restricted by the outer circumference of the pivot shaft 23, the circumferential surface is deformed in a wavy fashion in cross section, as shown in FIG. 8, whereby a lot of energy can effectively be absorbed after the impact has been absorbed by the retaining plate 30 although the absorbing width decreases gradually, as shown in FIG. 9.

Figure 10:
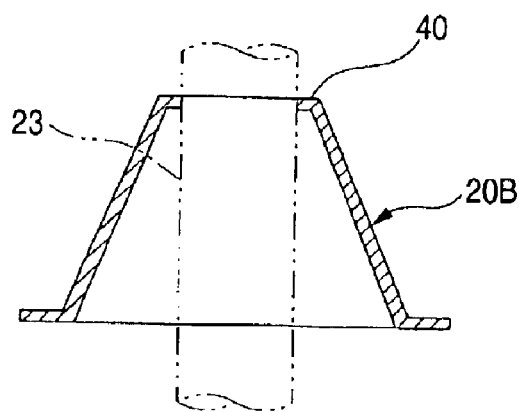
FIG. 10 is a sectional view showing a still another energy absorbing member.
Figure 11:
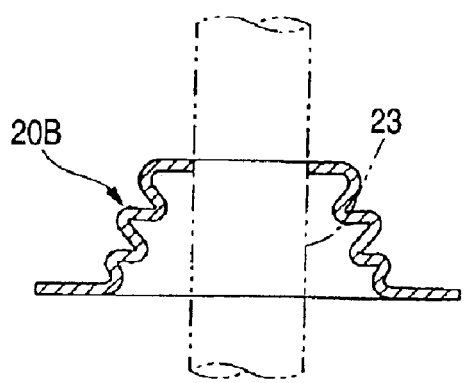
FIG. 11 is a sectional view showing a condition in which the energy absorbing member shown in FIG. 10 is deformed.

In addition, as shown in FIG. 10, a truncated conical energy absorbing member 20B may be used. This energy absorbing member 20B is structured such that a flange portion 40 constituting an upper circumferential edge is formed inwardly and is provided with a function to support a pivot shaft 23. Also in this embodiment, a pivot shaft holder 17 can be thinner in thickness and smaller in size, and a sufficient space for permitting the deformation of the energy absorbing member 20B can be secured around the circumference of the pivot shaft 23.

Figure 12:
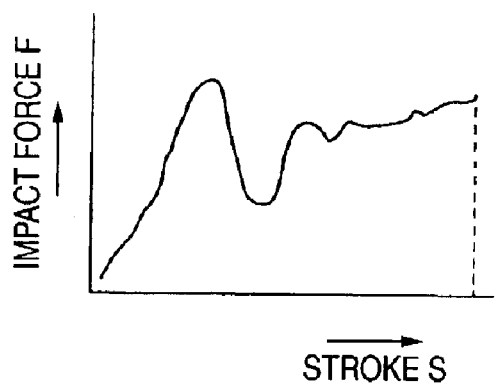
FIG. 12 is a graph showing the energy absorbing properties of the energy absorbing member shown in FIG. 10.

When the energy absorbing member 20B is compressed, since a large space is secured in the interior thereof for permitting the deformation of the energy absorbing member 20B, a circumferential surface thereof is bent and deformed inwardly and outwardly in a wavy configuration in cross section, as shown in FIG. 9. Consequently, as shown in FIG. 12, a lot of energy can be absorbed gradually in an effective manner, as shown in FIG. 12, after the impact has been absorbed by a retaining plate 30.

Figure 13:
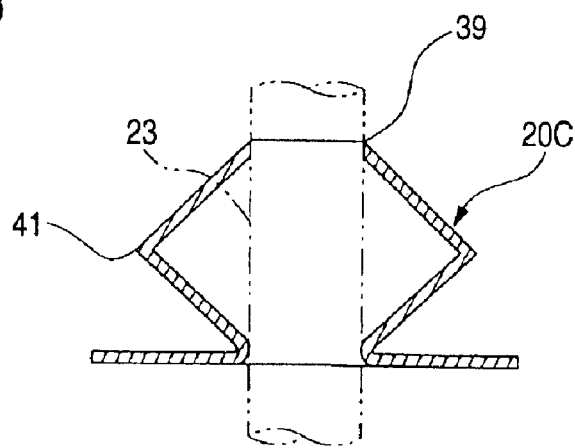
FIG. 13 is a sectional view showing further still another energy absorbing member.
Figure 14:
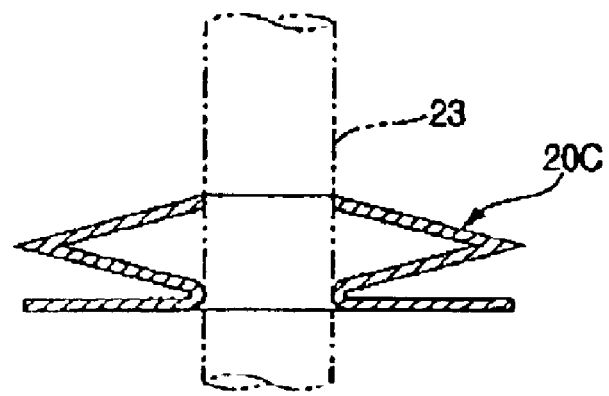
FIG. 14 is a sectional view showing a condition in which the energy absorbing member shown in FIG. 10 is deformed.
Figure 15:
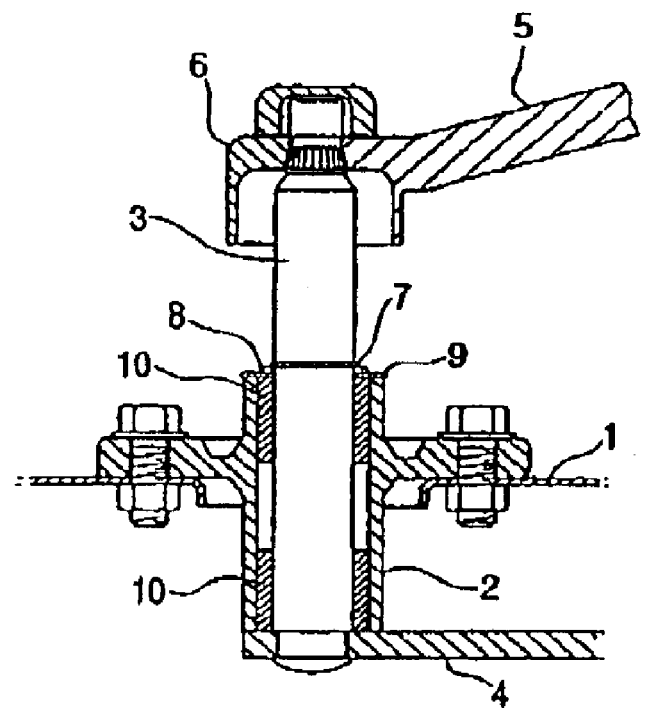
FIG. 15 is a sectional view showing a conventional energy absorbing member.
Figure 16:
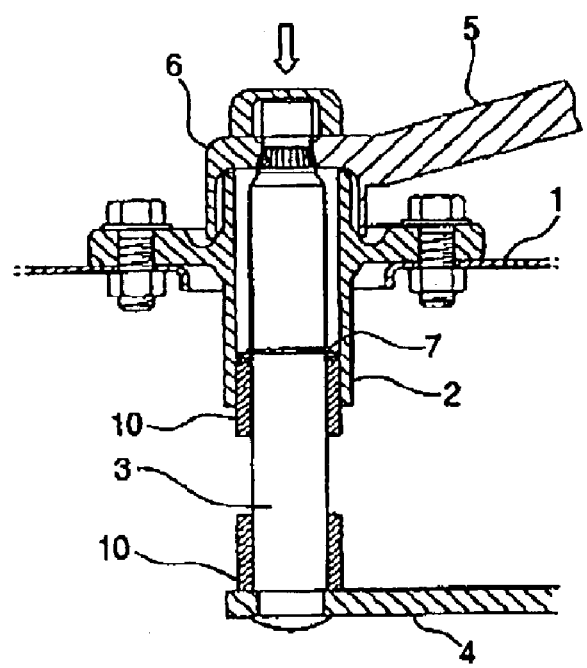
FIG. 16 is a sectional view showing a condition in which the conventional energy absorbing member is deformed.

Furthermore, as shown in FIG. 13, an energy absorbing member 20C having a bent portion 41 can be used. This energy absorbing member 20C is also constructed so as to support a pivot shaft 23 at an upper circumferential edge 39 thereof and is provided with the bent portion 41 which folds outwardly at a substantially central portion thereof in a vertical direction.

In this embodiment, too, the load borne by the pivot shaft holder 17 can be reduced by supporting the pivot shaft 23 by the upper circumferential edge of the energy absorbing member 20C, whereby the pivot shaft holder 17 can be made thinner in thickness and smaller in size.

According to the construction, when the energy absorbing member 20C is compressed the energy absorbing member 20 can be bent and deformed outwardly at the position where the bent portion 41 is formed to thereby absorb the impact energy.

Consequently, according to the embodiments, the energy can be absorbed by the broken retaining plate 30, and moreover, the energy can also be absorbed by the deformed energy absorbing member 20, 20A, 20B or 20C. In addition, the respective energy absorbing members 20, 20A, 20B, 20C can also be provided with the function to support the pivot shaft 23 by the pivot shaft holder 17.

As a result, not only can the safety in collision against an obstacle be increased but also the weight of the pivot shaft holder 17 can be reduced.

Note that the invention is not limited to the embodiments that have been described heretofore, and while the retaining plate 30 is described as being provided as the impact absorbing portion in those embodiments, the impact absorbing portion is not limited to the retaining plate 30 but may take any form provided that it can break in an initial stage of the input of the impact load to thereby absorb energy produced by the impact load.

In addition, while, for example, the retaining plate 30 adapted to be broken to thereby absorb energy is described as the impact absorbing portion, an impact absorbing portion adapted to be deformed to thereby absorb energy may be used provided that it permits the movement of the pivot shaft 23. Similarly, while all the energy absorbing members 20, 20A, 20B, 20C are members adapted to be deformed to thereby absorb energy, an energy absorbing member may be adopted which is constructed to be broken while permitting the movement of the pivot shaft, or an energy absorbing member may also be constructed to be deformed and broken to thereby absorb energy.

In addition, the materials of the respective members including such as the retaining plate 30 and the energy absorbing member 20 do not have to be limited to the materials described in the above embodiments but any other materials may be adopted.

As has been described heretofore, according to the first aspect of the invention, the energy absorbing member can be disposed by making use of the space between the wiper arm and the pivot shaft holder, and when the certain load is applied to the pivot shaft via the wiper arm, the impact absorbing portion is caused to be broken or deformed, allowing thereby the pivot shaft to start to sink into the pivot shaft holder. As this occurs, the wiper arm moves to approach the pivot shaft holder, and the energy absorbing member is broken or deformed to thereby absorb the moving energy of the pivot shaft so moving. According to this construction, a lot of energy can be absorbed not only when the impact absorbing portion is broken or deformed but also when the pivot shaft moves to sink into the pivot shaft holder, and therefore there is provided an advantage that the energy absorbing capability can be increased by making effective use of the moving stroke of the pivot shaft in the sinking direction. As a result, the wiper system can be obtained which is small in size and which can provide a high energy absorbing capability.

According to the second aspect of the invention, the impact absorbing portion is broken or deformed and the cylindrical energy absorbing member can then absorb the energy of the moving pivot shaft while being compressed to be deformed. In addition, the circumferential surface of the cylindrical energy absorbing member is bent and deformed and the bent portions can then absorb the energy while moving the circumferential surface of the energy absorbing member. Thus, there is provided an advantage that a lot of energy can be absorbed by the compressed deformation of the energy absorbing member and the movement of the bent portions along the circumferential surface of the energy absorbing member.

According to the third aspect of the invention, since the energy absorbing member can be provided with the pivot shaft supporting function, the pivot shaft can be made light in weight and small in size by that extent. Consequently, there is provided an advantage that the sufficient space can be secured around the circumference of the pivot shaft for permitting the deformation of the energy absorbing member by making the pivot shaft thinner in thickness.

What is claimed is:

1. An energy absorbing wiper system for a vehicle, comprising:

a pivot shaft to which a wiper arm is fixed;

a pivot shaft holder into which said pivot shaft is rotatably inserted;

an impact absorbing portion provided between said pivot shaft and said pivot shaft holder, said impact absorbing portion being adapted to be broken or deformed when a certain load is applied thereto to thereby permit the movement of said pivot shaft in a sinking direction relative to said pivot shaft holder;

an energy absorbing member connected to said pivot shaft holder and interposed between said wiper arm and said pivot shaft holder, said energy absorbing member adapted to be broken or deformed while permitting the sink of said pivot shaft when said pivot shaft moves in the sinking direction after said impact absorbing portion has been broken or deformed, to thereby absorb the moving energy of said pivot shaft; and wherein said energy absorbing member comprises:

an upper portion and a lower portion;

at least a small-diameter portion and an intermediate-diameter portion arranged sequentially in that order from the upper portion of the energy absorbing member, the small-diameter portion and the intermediate-diameter portion including circumferential surfaces formed in a step-like fashion as viewed in cross section;

an inner bent portion and an outer bent portion formed sequentially from the small-diameter portion to the intermediate-diameter portion, the inner and outer bent portions being regions where the energy absorbing member begins to deform and bend;

a plane provided between and straddling the small-diameter portion and the intermediate-diameter portion;

the lower portion including a circumferentially-edged flange portion fixed to said pivot shaft holder; and wherein the energy absorbing member is adapted to be held in a receiving portion of a base portion of the wiper arm and is constructed such that it can be compressed against an upper wall of the base portion of the wiper arm, and wherein the plane is constructed such that it can be pressed against a lower portion of said receiving portion.

2. The energy absorbing wiper system as set forth in claim 1, wherein said energy absorbing member includes an upper circumferential edge that is constructed to support said pivot shaft.

3. The energy absorbing wiper system as set forth in claim 1, wherein said pivot shaft holder has a flange portion for fixing said pivot shaft holder to a vehicle side, and wherein said energy absorbing member is disposed on said flange portion of said pivot shaft holder.

* * * * *